United States Patent [19]

Dwyer et al.

[11] Patent Number: 5,182,090
[45] Date of Patent: * Jan. 26, 1993

[54] SYNTHESIS OF LARGE CRYSTAL SIZE ZSM-5

[75] Inventors: Francis G. Dwyer, West Chester, Pa.; Pochen Chu, West Deptford, N.J.; William E. Cormier, Jr., Ellicott City, Md.

[73] Assignee: Mobil Oil Corp., Fairfax, Va.

[*] Notice: The portion of the term of this patent subsequent to Mar. 1, 2000 has been disclaimed.

[21] Appl. No.: 839,731

[22] Filed: Feb. 19, 1992

Related U.S. Application Data

[60] Continuation of Ser. No. 641,325, Nov. 15, 1991, abandoned, which is a continuation of Ser. No. 184,651, Apr. 22, 1988, abandoned, which is a continuation-in-part of Ser. No. 782,186, Sep. 30, 1985, abandoned, which is a continuation of Ser. No. 429,361, Sep. 30, 1982, abandoned, which is a division of Ser. No. 289,435, Aug. 3, 1981, abandoned, which is a continuation-in-part of Ser. No. 926,472, Jul. 20, 1978, abandoned, which is a continuation-in-part of Ser. No. 784,497, Apr. 4, 1977, abandoned, said Ser. No. 184,651, is a continuation-in-part of Ser. No. 906,601, Sep. 10, 1986, abandoned, which is a continuation of Ser. No. 720,915, Apr. 8, 1985, which is a continuation-in-part of Ser. No. 504,114, Jun. 14, 1983, abandoned, which is a division of Ser. No. 192,660, Oct. 1, 1980, abandoned, which is a continuation-in-part of Ser. No. 82,825, Oct. 9, 1979, abandoned, said Ser. No. 184,651, is a continuation-in-part of Ser. No. 714,070, Mar. 21, 1985, abandoned, which is a continuation of Ser. No. 228,834, Jan. 27, 1981, abandoned, which is a continuation of Ser. No. 47,535, Jun. 11, 1979, abandoned, which is a continuation-in-part of Ser. No. 304,725, Sep. 23, 1981, Pat. No. 4,375,458, which is a division of Ser. No. 949,461, Oct. 10, 1978, abandoned, which is a continuation-in-part of Ser. No. 835,369, Aug. 17, 1977, abandoned.

[51] Int. Cl.$^5$ ............................................. C01B 33/34
[52] U.S. Cl. ............................ 423/704; 423/DIG. 22
[58] Field of Search .................... 423/328, 329, 330; 502/60, 64, 77, 79

[56] References Cited

U.S. PATENT DOCUMENTS

| | | | |
|---|---|---|---|
| 3,702,886 | 11/1972 | Argauer et al. | 423/328 |
| 3,941,871 | 3/1976 | Dwyer et al. | 423/326 |
| 4,088,605 | 5/1978 | Rollmann | 423/328 |
| 4,100,215 | 7/1978 | Chen | 260/671 M |
| 4,191,638 | 3/1980 | Plank et al. | 208/139 |
| 4,375,458 | 3/1983 | Dwyer et al. | 423/329 |
| 4,410,452 | 10/1983 | Chu et al. | 502/60 |

OTHER PUBLICATIONS

Lok, B. M. et al, "The role of organic molecules in molecular sieve synthesis", Zeolites, vol. 3, pp. 282–291 (1983).
Breck, D. W., Zeolite Molecular Sieves, pp. 304–321, 376–377 (1974).

Primary Examiner—R. Bruce Breneman
Attorney, Agent, or Firm—Alexander J. McKillop; Charles J. Speciale; Edward F. Kenehan, Jr.

[57] ABSTRACT

There is provided a method for making large crystal size ZSM-5. This method involves the use of two organic cations, specifically tetrapropylammonium (TPA) and tetramethylammonium (TMA) cations, in the reaction mixture. This method further involves the use of a source of deliberately added alumina, such as aluminum sulfate, in the reaction mixture.

1 Claim, No Drawings

SYNTHESIS OF LARGE CRYSTAL SIZE ZSM-5

CROSS-REFERENCE TO RELATED APPLICATIONS

This application is a continuation of copending U.S. application Ser. No. 07/641,325, filed Jan. 15, 1991, now abandoned, which is a continuation of U.S. application Ser. No. 07/184,651, filed Apr. 22, 1988, now abandoned.

This Ser. No. 07/184,651 is a continuation-in-part of copending U.S. application Ser. No. 782,186, filed Sep. 30, 1985, now abandoned. This Ser. No. 782,168 is a continuation of U.S. application Ser. No. 429,361, filed Sep. 30, 1982, now abandoned. This Ser. No. 429,361 is a divisional of U.S. application Ser. No. 289,435, filed Aug. 3, 1981, now abandoned. This Ser. No. 289,435 is a continuation-in-part of U.S. application Ser. No. 926,472, filed Jul. 20, 1978, now abandoned. This Ser. No. 926,472 is a continuation-in-part of U.S. application Ser. No. 784,497, filed Apr. 4, 1977, now abandoned.

Ser. No. 07/184,651 is also a continuation-in-part of copending U.S. application Ser. No. 906,601, filed Sep. 10, 1986, now abandoned. This Ser. No. 906,601 is a continuation of U.S. application Ser. No. 720,915, filed Apr. 8, 1985, now abandoned. This Ser. No. 720,915 is a continuation-in-part of U.S. application Ser. No. 504,114, filed Jun. 14, 1983, now abandoned. This Ser. No. 504,114 is a division of U.S. application Ser. No. 192,660, filed Oct. 1, 1980, now abandoned. This Ser. No. 192,660 is a continuation-in-part of U.S. application Ser. No. 82,825, filed Oct. 9, 1979, now abandoned.

Ser. No. 07/184,651 is also a continuation-in-part of copending U.S. application Ser. No. 714,070, filed Mar. 21, 1985, now abandoned. This Ser. No. 714,070 is a continuation of U.S. application Ser. No. 228,834, filed Jan. 27, 1981, now abandoned. This Ser. No. 228,834 is a continuation of U.S. application Ser. No. 47,535, filed Jun. 11, 1979, now abandoned.

Particularly insofar as applications mentioned hereinabove, including said Ser. Nos. 429,361; 289,435; 504,114; 912,660; and 228,834, shared copendency and common disclosure with U.S. application Ser. No. 304,725, filed Sep. 23, 1981, now U.S. Pat. No. 4,375,458 (issued Mar. 1, 1983), continuation-in-part status is also claimed herein to said Ser. No. 304,725. This Ser. No. 304,725 is a division of U.S. application Ser. No. 949,461, filed Oct. 10, 1978, now abandoned. This Ser. No. 949,461 is a continuation-in-part of U.S. application Ser. No. 835,369, filed Aug. 17, 1977, now abandoned.

The entire disclosures of the above-mentioned applications and the U.S. patent referenced in this section entitled CROSS-REFERENCE TO RELATED APPLICATIONS are expressly incorporated herein by reference.

BACKGROUND

The present invention relates to a method for producing large crystal zeolite ZSM-5 from a reaction mixture containing a mixture of tetrapropylammonium (TPA) cations and tetramethylammonium (TMA) cations. The reaction mixture also includes a source of deliberately added alumina such as, for example, aluminum sulfate.

ZSM-5 has a distinctive X-ray diffraction pattern which distinguishes it from other known zeolites. The original alkali metal cations, if any, of ZSM-5 can be exchanged by ion exchange with other ions to form species of the zeolite which have exceptional catalytic properties. Zeolite ZSM-5 and its preparation are the subject of U.S. Pat. No. 3,702,886, the entire disclosure of which is expressly incorporated herein by reference. That patent discloses an average particle diameter of less than ½ micron.

U.S. Pat. No. 3,941,871, the entire disclosure of which is also expressly incorporated herein by reference, describes a method for preparing crystalline metal organosilicate ZSM-5 from reaction mixtures containing no deliberately added aluminum. However, as pointed out in column 4, lines 19–26 of this 3,941,871 patent, aluminum may be present in the reaction mixtures as impurities from other reactants and/or equipment used. For example, sources of silica contain aluminum impurities often in quite detectable but trace quantities. Accordingly, the organosilicates of the 3,941,871 are said to possibly contain readily detectable quantities of alumina, but in no event is the silica to alumina molar ratio of these organosilicates said to be less than or equal to 200. Example 5 of this 3,941,871 patent describes the preparation of ZSM-5 from reaction mixture containing both tetrapropylammonium (TPA) and tetramethylammonium (TMA) cations, but the reaction mixture does not contain a deliberately added source of alumina such as, e.g., aluminum sulfate.

SUMMARY

In accordance with the present application, there is provided a method for preparing ZSM-5, said method comprising forming an aqueous reaction mixture comprising sources of silica, alumina, tetrapropylammonium cations and tetramethylammonium cations, wherein said reaction mixture includes a source of deliberately added alumina which is not an aluminum containing impurity from the other reactants and/or equipment used, and maintaining said reaction mixture under sufficient crystallization conditions until crystals of said ZSM-5 are formed. Large ZSM-5 crystals are formed by this method. Expressed in one form, these crystals may be said to have an average particle size diameter of at least one micron, e.g., from 1 to 100 microns. Expressed in other terms, these crystals may be said to have a minimum dimension of at least one micron.

EMBODIMENTS

A source of deliberately added alumina is used in the present reaction mixture. In other words, the alumina source in this reaction mixture is not entirely supplied as an impurity from other reactants (e.g., the silica source) and/or the equipment used. Examples of such sources of deliberately added alumina include aluminum sulfate, aluminum chloride, aluminum nitrate, sodium aluminate, alumina and aluminum granules. A particular source of deliberately added alumina is aluminum sulfate, e.g., $Al_2(SO_4)_3 \cdot 16 H_2O$. As a result of the use of a source of deliberately added alumina in the reaction mixture, the ZSM-5 produced may have a silica/alumina molar ratio of 200 or less, e.g., from about 10 to about 200. The composition of the reaction mixture may be expressed in terms of moles of $SiO_2$, $Al_2O_3$, $H_2O$, $OH^-$, TMA, TPA and M, where TMA represents tetramethylammonium ions, TPA represents tetrapropylammonium ions and M represents alkali metal (e.g., Na) and alkaline earth metal cations. The symbol, R, may be used to represent the sum of the moles of the organic cations, TMA and TPA. The present reaction mixture may also contain other, e.g., nonessential, components such as counterions for M, TPA and TMA.

Using the terms mentioned hereinabove, the present reaction mixture may have a molar ratio of $SiO_2/Al_2O_3$ of, e.g., 180 or less, e.g., 175 or less, e.g., 20–150, e.g., 20–90 or 30–100. The molar ratio of $R/SiO_2$ in the reaction mixture may be, e.g., 0.1–1.5, e.g., 0.05–0.8, e.g., 0.1–0.4. The molar ratio of $TPA/SiO_2$ in the reaction mixture may be, e.g., 0.01–1.0, and the molar ratio of $TMA/SiO_2$ in the reaction mixture may be, e.g., 0.01–0.5.

The present reaction mixture may have a relatively high solids content. This solids content may be essentially expressed in terms of the ratio of moles of water to moles of silica. The $H_2O/SiO_2$ molar ratio of the present reaction mixture may be, e.g., 100 or less, e.g., 5–100, e.g., 10–70, e.g., 20–50.

The $OH^-/SiO_2$ molar ratio of the present reaction mixture may be, e.g., 1.5 or less, e.g., 0.01–1.5, e.g., 0.05–0.8, e.g., 0.1–0.4. It will be understood that in calculating the mole ratio of hydroxide ions/silica, it is conventional to calculate hydroxide by summing moles of $OH^-$, whether added as NaOH, as quaternary ammonium hydroxide (in the case of a conventional preparation), as sodium silicate ($NaOH + SiO_2$), as sodium aluminate ($NaOH + Al_2O_3$), or the like and to subtract from that sum any moles of acid added. Acid may be added simply as HCl, $HNO_3$, $H_2SO_4$, acetic acid, and the like or it may be added as an aluminum sulfate ($Al_2O_3 + H_2SO_4$), chloride ($Al_2O_3 + HCl$), nitrate ($Al_2O_3 + HNO_3$), etc. Each mole of $Al_2O_3$ is itself equivalent to 2 moles of acid in this calculation, since $Al_2O_3$ consumes 2 moles of hydroxide in its conversion to framework aluminate ion. When organic bases such as amines are present in the reaction mixture, no contribution is assigned to such organic bases in this calculation. Amines present in reaction mixtures having an $OH^-/SiO_2$ ratio of 0.01 are protonated when further acid is added. Until said additional acid exceeds the amine present, the pH remains above 7.

The present reaction mixture may contain deliberately added sources of cations of alkali metals and/or alkaline earth metals. Optionally, the present reaction may be free of deliberately added sources of such cations. Deliberately added sources of sodium include, e.g., sodium silicate, sodium aluminate, sodium hydroxide and sodium chloride. A source of an alkali metal or alkaline earth metal cation which would not be a deliberately added source of such cations would be a reactant which contains trace quantities of such cations, e.g., as impurities. For example, silica gel, used as a source of silica, might contain trace quantities (e.g., 0.04 percent by weight of solids or less) of alumina (i.e. $Al_2O_3$) or sodium expressed in terms of sodium oxide (i.e., $Na_2O$). Such silica gel would constitute a source of deliberately added silica, but this silica gel would not constitute a source of either deliberately added alumina or deliberately added sodium. Depending upon whether or not the present reaction mixture contains sources of deliberately added alkali metal or alkaline earth metal cations (M), the molar ratio of $M/SiO_2$ in the reaction mixture may be, e.g., 3.0 or less, e.g., 0.01–3.0, e.g., 0.02–0.2.

In accordance with a particular embodiment of the present application, the present reaction mixture is free of sources of deliberately added alkali metal or alkaline earth metal cations. In accordance with this embodiment, the reaction mixture may contain, e.g., no more than only 0.1 percent by weight alkali metal and alkaline earth metal cations based upon the entire weight of the reaction mixture including water. Most of these alkali metal and alkaline earth metal (M) cations may result from trace impurities in the sources of silica and alumina. Other sources of reactants may also contain trace impurities of M. Deionized water should be used in the reaction mixture in order to avoid the presence of M in the reaction mixture.

In accordance with another particular embodiment of the present application, the reaction mixture may have a relatively high pH and/or a relatively high alumina content. More particularly, the reaction mixture may have an $OH^-/SiO_2$ molar ratio 0.07 or less, e.g., between about 0.01 and less than 0.07, e.g., 0.03–0.06, and the reaction mixture may have a $SiO_2/Al_2O_3$ molar ratio of from 20:1 to 90:1. Depending upon the sources of reactants used in the reaction mixture, particularly the sources of silica and alumina, it may be necessary to incorporate into the reaction mixture a substantial amount of acid in order to achieve a molar ratio of $OH^-/SiO_2$ of 0.07 or less. For example, sodium silicate ($NaOH + SiO_2$) contributes a substantial amount of $OH^-$ into the reaction mixture in order to arrive at a molar ratio of 0.07 or less for $OH^-/SiO_2$ of the reaction mixture.

In accordance with embodiments described herein, it has been observed that the crystal size of ZSM-5 increases as the $OH^-/SiO_2$ ratio decreases, particularly within the range of 0.01–0.07. The crystallization rate goes through a maximum and then decreases in this region. Thus, there is an optimum crystallization rate vs. crystal size.

The composition for the synthesis of synthetic ZSM-5 can be prepared utilizing materials which can supply the appropriate oxide. Such materials include aluminates, alumina, silicates, silica hydrosol, silica gel, silicic acid and hydroxides. It will be understood that each oxide component utilized in the reaction mixture for preparing ZSM-5 can be supplied by one or more essential reactants and they can be mixed together in any order. For example, any oxide can be supplied by an aqueous solution, sodium hydroxide or by an aqueous solution of a suitable silicate; the organic nitrogen-containing cation can be supplied by a compound of that cation, such as, for example, a salt. The reaction mixture can be prepared either batchwise or continuously. Crystal size and crystallization time of the ZSM-5 composition may vary with the nature of the reaction mixture employed.

Crystallization may take place by heating the reaction mixture to a sufficient temperature for a sufficient period of time until crystals of ZSM-5 are formed. The temperature of crystallization may be, e.g., from about 100° F. to about 400° F., e.g., from about 80° C. to about 200° C. The duration of holding the reaction mixture at this temperature may be e.g., from about 1 hour to about 180 days, e.g., from 4 hours to 30 days. For example, the reaction mixture may be held at a temperature of from about 180° F. to about 350° F. for a period of time from about 2 hours to about 30 days. After crystallization, the product crystals may then be separated, as by cooling and filtering, and may then be water washed and dried, e.g., at a temperature of from about 80° C. to about 150° C.

The as-synthesized ZSM-5 crystals may contain organic cations (e.g. TPA and TMA), possibly within the intracrystalline free space of the ZSM-5. TPA and TMA can be removed by simple calcination, e.g., to at least about 300° C., preferably in air.

The ZSM-5 zeolites described herein can be used either in the as-synthesized form or in another form, e.g., the ammonium form, the hydrogen form, or another univalent or multivalent cationic form. Preferably, one or the other of the last two forms is employed. They can also be used in intimate combination with a hydrogenating component such as tungsten, vanadium, molybdenum, rhenium, nickel, cobalt, chromium, manganese, or a noble metal such as platinum or palladium where a dydrogenation-dehydrogenation function is to be performed. Such component can be exchanged into the composition, impregnated onto it or physically intimately admixed therewith. Such component can be impregnated in or onto the present catalyst by, for example, treating the zeolite with a platinum metal-containing ion. Suitable platinum compounds that may be used include chloroplatinic acid, platinous chloride and various compounds containing the platinum amine complex.

The compounds of platinum or other useful metals can be divided into compounds in which the metal is present in the cation of the compound and compounds which it is present in the anion of the compound. Both types which contain the metal in the ionic state can be used. A solution in which platinum metals are in the form of a cation or cationic complex, e.g., $Pt(NH_3)_6Cl_4$ is particularly useful. For some hydrocarbon conversion processes, this noble metal form of the catalyst is unnecessary, such as in low temperature, liquid phase ortho xylene isomerization.

The zeolite, when employed either as an adsorbent or as a catalyst in one of the aforementioned processes, should be dehydrated at least partially. This can be done by heating to a temperature in the range of 200° to 600° in an atmosphere such as air, nitrogen, etc., and at atmospheric or subatmospheric pressures for between 1 and 48 hours. Dehydration can also be performed at lower temperatures merely by placing the catalyst in a vacuum, but a longer time is required to obtain a sufficient amount of dehydration.

In accordance with the embodiments described herein relating to the preparation of ZSM-5 from a reaction mixture free of deliberately added M, the reactants should ideally contain no alkali metal or alkaline earth metal cations. However, with present manufacturing techniques, it is practically impossible to removal all the metal cations from the reactants. Thus, as a practical matter the reactants employed may have alkali metal or alkaline earth metals approaching zero, but may have up to 0.1% by weight of sodium or other alkali metal or alkaline earth metal cations therein. Accordingly, the expression "free of added alkali metal or alkaline earth metal cations" or equivalent expressions simply means that no such metal is added to the reaction mixture.

ZSM-5 can have, as has been mentioned, other cations associated therewith. These may be any of a wide variety of other cations associated with the zeolite according to applicable techiques well known in the art. Typical cations would include hydrogen, ammonium and metal cations including mixtures of the same. Of the metallic cations, particular mention is made of cations of metals such as rare earth metals, manganese and calcium, as well as metals of Group II of the Periodic Table, e.g., zinc and Group VIII of the Periodic Table, e.g., nickel.

Typical ion exchange techniques include impregnating or contacting the ZSM-5 with a salt solution of the desired replacing cation or cations. Although a wide variety of salts can be employed, particular reference is given to chlorides, nitrates and sulfates.

Representative ion exchange techniques are disclosed in a wide variety of patents including U.S. Pat. Nos. 3,140,249; 3,140,251 and 3,140,253.

Following contact with the salt solution of the desired cation, the zeolites are then preferably washed with water and dried at a temperature ranging from 150° F. to about 600° F. and thereafter calcined in air or other inert gas at temperatures ranging from about 500° F. to about 1500° F. for periods of time ranging from 1 to 48 hours or more.

Regardless of the cations associated with the catalyst, the spatial arrangement of the aluminum, silicon and oxygen atoms which form the basic crystal lattices in any given zeolite remains essentially unchanged by exchange or impregnation. More particularly, for example, the X-ray diffraction patterns of several ion-exchanged ZSM-5 zeolites reveal a pattern substantially the same as that set forth in U.S. Pat. No. 3,702,886.

As in the case of many catalysts, it is desired to incorporate the catalysts described herein with another material resistant to the temperatures and other conditions employed in organic conversion processes. Such materials include active and inactive materials and synthetic or naturally occurring zeolites as well as inorganic materials such as clay, silica and/or metal oxides. The latter may be either naturally occurring or in the form of gelatinous precipitates or gels including mixtures of silica and metal oxides. Use of a material in conjunction with the present catalyst tends to improve the conversion and/or selectivity of the catalyst in certain organic conversion processes. Inactive materials suitably serve as diluents to control the amount of conversion in a given process so that products can be obtained economically and in orderly manner without employing other means for controlling the rate of reaction. Normally, zeolite materials have been incorporated into naturally occurring clays, e.g., bentonite and kaolin, to improve the crush strength of the catalyst under commercial operating conditions. These materials, i.e., clays, oxides, etc. function as binders for the catalyst. It is desirable to provide a catalyst having good crush strength, because in a petroleum refinery the catalyst is often subjected to rough handling, which tends to break the catalyst down into powder-like materials which cause problems in processing. The clay binders have been employed for the purpose of improving the crush strength of the catalyst.

Naturally occurring clays which can be composited with the catalyst include the montmorillonite and kaolin family, which families include the subbentonites, and the kaolins commonly known as Dixie, McNamee-Georgia and Florida clays or others in which the main mineral constituent is halloyside, kaolinite, dickite, nacrite, or anauxite. Such clays can be used in the raw state as originally mined or initially subjected to calcination, acid treatment or chemical modification.

In addition to the foregoing materials, the catalyst can be composited with a porous matrix material such as alumina, silica, silica-alumina, silica-magnesia, silica-zirconia, silica-thoria, silica-beryllia, silica-titania, as well as ternary compositions such as silica-alumina-thoria, silica-alumina-zirconia, silica-alumina-magnesia and silica-magnesia-zirconia. The matrix can be in the form of a cogel. The relative proportions of the finely divided crystalline aluminosilicate and inorganic oxide gel matrix vary widely with the crystalline aluminosilicate content ranging from about 1 to about 90 percent by weight and more usually, particularly when the composite is prepared in the form of beads in the range of about 2 to about 50 percent by weight of the composite.

Employing the catalyst of this invention containing a hydrogenation component, heavy petroleum residual stocks, cycle stocks and other hydrocrackable charge stocks can be hydrocracked at temperatures between 400° F. and 850° F. using molar ratios of hydrogen to hydrocarbon charge in the range between 2 and 80. The pressure employed will vary between 10 and 2,500 psig and the liquid hourly space velocity between 0.1 and 10.

Employing the catalyst of this invention of catalytic cracking, hydrocarbon cracking stocks can be cracked at a liquid hourly space velocity between about 0.5 and 50, a temperature between about 550° F. and 1300° F., a pressure between about atmospheric and a hundred atmospheres.

Employing a catalytically active form of ZSM-5 containing a hydrogenation component, reforming stocks can be reformed employing a temperature between 700° F. and 1000° F. The pressure can be between 100 and 1000 psig, but is preferably between 200 and 700 psig. The liquid hourly space velocity is generally between 0.1 and 10, preferably between 0.5 and 4 and the hydrogen to hydrocarbon mole ratio is generally between 1 and 20 preferably between 4 and 12.

The catalyst can also be used for hydroisomerization of normal paraffins, when provided with a hydrogenation component, e.g., platinum. Hydroisomerization is carried out at a temperature between 200° and 700° F, preferably 300° to 550° F., with a hourly space velocity between 0.1 and 2, preferably between 0.25 and 0.50 employing hydrogen such that the hydrogen to hydrocarbon mole ratio is between 1:1 and 5:1. Additionally, the catalyst can be used for olefin isomerization employing temperatures between 30° F. and 500° F.

Other reactions which can be accomplished employing the catalyst of this invention containing a metal, e.g., platinum, including hydrogenation-dehydrogenation reactions and desulfurization reactions.

Examples 1 and 2 illustrate embodiments described herein where the reaction mixture contains no deliberately added alkali metal or alkaline earth metal ions. These Examples correspond to Examples 1 and 2 of copending U.S. application Ser. No. 782,186, which has previously been reference herein. Parts in these Examples 1 and 2 are by weight.

EXAMPLES 1 and 2

To a mixture of 28.4 parts of silica gel, 180 parts of 25% tetramethylammonium hydroxide and 40 parts of water in an autoclave was added a solution of 1.7 part of aluminum sulfate [$Al_2(SO_4)_3.16H_2O$], 18.0 parts of sulfuric acid and 10.6 parts of tetrapropylammonium bromide in 200 parts of water. The reaction mixture had the molar composition shown in Table 1 below. The gel was stirred, and the autoclave was heated at 160° C. for 6 days to crystallize the zeolite. The product was filtered, washed with water and dried. An X-ray diffraction pattern showed the sample to be ZSM-5, as summarized in Table 1.

Example 2 was similarly prepared.

The silica gel used in these examples contained 99.6% $SiO_2$, 0.03% $Al_2O_3$ and a trace of $Na_2O$, specifically about 0.04% $Na_2O$. The TPA.OH used was prepared from TPA.Br and $Ag_2O$. Aluminum was added as $Al_2(SO_4)_3.16H_2O$, as aluminum granules or as $Al_2O_3.3H_2O$.

Large crystals, i.e., crystals whose minimum dimension exceeds 1μ and may be as great as about 20μ, can be prepared by the procedures of these Examples. More particularly, the ZSM-5 crystals obtained in Examples 1 and 2 had average dimensions of 4X20μ.

TABLE 1

| | Reaction Mixture Composition, Mole Ratios | | | | | | Product, Mole Ratios | | |
|---|---|---|---|---|---|---|---|---|---|
| Example | Other Cation | $SiO_2$ $Al_2O_3$ | $H_2O$ $SiO_2$ | $OH$ $SiO_2$ | $TPA$ $SiO_2$ | $TMA$ $SiO_2$ | $SiO_2$ $Al_2O_3$ | $R(C)$ $SiO_2$ | $Na$ $SiO_2$ |
| 1(a) | TMA | 175 | 46 | 0.23 | 0.08 | 1.06 | 159 | 0.06 | $1 \times 10^{-4}$ |
| 2(b) | TMA | 90 | 45 | 0.10 | 0.67 | 1.20 | 86 | 0.05 | $1 \times 10^{-4}$ |

(a)Crystallized at 160° C. for 6 days, 70% ZSM-5
(b)Crystallized at 160° C. for 7 days, 50% ZSM-5
(c)R is the sum of the TPA and TMA cations Examples 3-13 which follow correspond to Examples 1-11 of copending U.S. application Ser. No. 906,601, which has previously been referenced herein. In Examples 3-13 below, an exercise of the effect of $OH/SiO_2$ and $TMA/SiO_2$ ratio on effective crystal size in ZSM-5 synthesis was performed using as variables the following mole ratios of reaction mixture components: (160° C. with stirring)

| | |
|---|---|
| $SiO_2/Al_2O_3$ | $Na/SiO_2$ |
| $H_2O/SiO_2$ | $TPA/SiO_2$ |
| $OH/SiO_2$ | $TMA/SiO_2$ |

Unless noted all experiments used Q-brand sodium silicate, $Al_2(SO_4)_3.16H_2SO_4$, and TPA Br.

Table 2 summarizes the effect of $TMA/SiO_2$ ratio on effective crystal size at one fixed $OH/SiO_2$ mole ratio whereas Table 3 summarizes the effect of $OH/SiO_2$ mole ratio on effective crystal size at one fixed $TMA/SiO_2$ mole ratio.

TABLE 2

Crystallization of ZSM-5
Q-brand; $Al_2(SO_4)_3.16H_2O$
160° C.; stirred 1000 rpm
$SiO_2/Al_2O_3$ = 180; $H_2O/SiO_2$ = 40; $OH/SiO_2$ = 0.10;
$Na/SiO_2$ = 0.6; $TPA/SiO_2$ = 0.10<sup>a</sup>
Run Time = 21 hrs<sup>b</sup>

| Example | Mixture<sup>a</sup> $TMA/SiO_2$ | Product Crystallinity | Effective Crystal size (μM)<sup>d</sup> |
|---|---|---|---|
| 3<sup>c</sup> | 0 | 90% | 0.39 |
| 4 | 0.033 | 98% | 1.11 |
| 5 | 0.066 | 100% | 2.22 |
| 6<sup>c</sup> | 0.10 | 100% | 2.04 |
| 7 | 0.20 | 100% | 1.48 |

TABLE 2-continued

Crystallization of ZSM-5
Q-brand; $Al_2(SO_4)_3 \cdot 16H_2O$
160° C.; stirred 1000 rpm
$SiO_2/Al_2O_3 = 180$; $H_2O/SiO_2 = 40$; $OH/SiO_2 = 0.10$;
$Na/SiO_2 = 0.6$; $TPA/SiO_2 = 0.10^a$
Run Time = 21 hrs$^b$

| Example | Mixture$^a$ TMA/SiO$_2$ | Product Crystallinity | Effective Crystal size (μM)$^d$ |
|---|---|---|---|
| 8 | 0.40 | 100% | 1.11 |

$^a$mole ratios
$^b$5 hours heat up to 160° C.
$^c$1 hour heat up to 160° C.
$^d$Average crystal diameters in microns referred to elsewhere in the text are for measurements based on microscopic observations such as attainable with a scanning electron microscope. The effective crystal sizes listed here and in Table 3 are numbers computed from o-xylene sorption rate. These sizes tend to be significantly smaller than average crystal diameters determined from microscopic examination but are used because of ease of measurement.

TABLE 3

Crystallization of ZSM-5
Q-brand; $Al_2(SO_4)_3 \cdot 16H_2O$
160° C.; stirred 1000 rpm
$SiO_2/Al_2O_3 = 180$; $H_2O/SiO_2 = 40$; $Na/SiO_2 = 0.6$;
$TPA/SiO_2 = 0.10$; $TMA/SiO_2 = 0.10^a$
Run Time = 21 hrs$^b$

| Example | Mixture$^a$ OH/SiO$_2$ | Effective Crystal size (μM)$^d$ |
|---|---|---|
| 9  | 0.01 | 0.80 |
| 10 | 0.02 | 0.94 |
| 11 | 0.04 | 1.88 |
| 12 | 0.06 | 1.66 |
| 13 | 0.10 | 2.89 |

$^a$mole ratios
$^b$5 hours heat up to 160° C.

Examples 14-25 which follow correspond to Examples 1 and 6-16 of U.S. application Ser. No. 304,725, now U.S. Pat. No. 4,375,458, which has previously been reference herein.

EXAMPLE 14

A silicate solution was made by mixing 6872 g of Q-brand sodium silicate (28.5% $SiO_2$, 8.9% $Na_2O$), 3976 g of $H_2O$ and 20 g of Daxad 27, a surfactant. The specific gravity of the solution at 60° F. was 1.297. An acid alum solution was made by mixing 238 g of $Al_2(SO_4)x\cdot H_2O$ (17.2% $Al_2O_3$), 574 g of $H_2SO_4$ (100%) 1200 g of TMACl (50% wt.), 1200 g of $H_2O$ and 3200 g of TPABr solution obtained by prereacting a mixture of equivalent amounts of tri-n-propylamine and n-propyl-bromide (the nitrogen content of the pre-reacted organic mixture was 1.43% wt). This will be referred to in the remaining examples as "pre-reacted organics". The specific gravity was 1.102 at 60° F.

The silicate and acid alum solutions were charged simultaneously into a 5-gallon capacity autoclave to form a gel. The gel was stirred at room temperature for a half hour into a uniform mixture. The crystallization was carried out at 320° F. with 90 rpm agitation. The time required to complete the crystallization was about 23 hours. The filtered, washed and dried solid product was shown by X-ray analysis to be 115% ZSM-5 and had a $SiO_2$ to $Al_2O_3$ ratio of 77.5. The crystallite size was determined by scanning electron microscope (SEM) and was found to be in the range of 12X7X5μ to 2X2X1μ.

EXAMPLE 15

A silicate solution was made according to Example 14. An acid alum solution was made by mixing 238 g of $Al_2(SO_4)_3 \cdot XH_2O$ (17.2 % $Al_2O_3$), 574 g of $H_2SO_4$, 3000 g of $H_2O$, 700 g of TMACl (50%) and 1524 g of pre-reacted organics (1.22% N by wt.). The calculated TPA and TMA mole ratio in the solution was 0.41. The solutions were charged into a 5 gallon capacity autoclave. The crystallization conditions were 320° F. and 90 rpm agitation. The crystallization was completed within 90 hours, the final product being found to contain 85% ZSM-5. The crystal size range was shown by SEM pictures to be 4X3X2μ to 2X1X1μ.

EXAMPLE 16

A silicate solution was made according to Example 14. An acid alum solution was made by mixing 238 g of $Al_2(SO_4)_3 \cdot XH_2O$ (17.2% $Al_2O_3$), 574 g of $H_2SO_4$, 185 g of $H_2O$, 700 g of TMACl (50%) and 4618 g of pre-reacted organics (1.22% N by wt.). The calculated TPA to TMA mole ratio in the solution was 1.25. The solutions were charged into a 5 gallon capacity autoclave. The crystallization conditions were 320° F. and 90 rpm agitation. The crystallization was completed within 12 hours. The washed and dried product was found to be 115% ZSM-5. The crystal size range was shown by SEM pictures to be 13X10X6μ to 2X2X1μ.

EXAMPLE 17

A silicate solution was made by mixing 90.9 lbs of Q-brand sodium silicate, 120 g of Daxad 27 and 44.6 lbs $H_2O$. An acid alum solution was made by mixing 1428 g of $Al_2(SO_4)_3 \cdot XH_2O$(17.2% $Al_2O_3$), 3444 g of $H_2SO_4$, 4200 g of TMACl (50%) and 79.0 lbs of pre-reacted organics (1.58% N by wt.). The calculated TPA to TMA mole ratio was 2.1. The above solutions were charged into a 30 gallon autoclave containing 1180 g of $H_2O$. The charging was done by the solutions through a mixing nozzle simultaneously. The gel was whipped for one hour at 90 rpm and at room temperature. The crystallization conditions were 320° F. with 90 rpm agitation. The crystallization was completed within 21 hours. The washed and dried product was found to be 90% ZSM-5 and had a $SiO_2$ to $Al_2O_3$ ratio of 74.1. The crystal size range was shown by SEM pictures to be 20X12X5μ to 4X3X2μ. From Example 15 to 17 it as found that the maximum crystal size increased from 4X3X2μ to 20X12X5μ as the ratio of TPA and TMA mole ratio increased from 0.41 to 2.1.

EXAMPLE 18

A silicate solution was made by mixing 90.9 lbs of Q-brand sodium silicate, 118 g of Daxad 27 and 52.6 lb of $H_2O$. An acid alum solution was made from 238 g of $Al_2(SO_4)_3 \cdot XH_2O$(17.2% $Al_2O_3$), 3444 g of $H_2SO_4$, 15.9 lb of $H_2O$, 7200 g of TMACl (50%) and 42.3 lb of pre-reacted organics (1.47% N by wt.). The above solutions were charged into a 30 gallon autoclave containing 1180 g of $H_2O$. The charging was done by feeding the solutions through a mixing nozzle simultaneously. The gel was then whipped for one hour at 90 rpm and at room temperature. The crystallization conditions were 320° F. with 90 rpm agitation. The crystallization was completed within 17 hours. The crystallinity of the washed and dried product was 130% ZSM-5 and it had a $SiO_2$ to $Al_2O_3$ ratio of 270. The crystal size was shown by SEM to be 7X5X3μ to 2X1.5X1μ.

EXAMPLE 19

A silicate solution was made according to Example 18. An acid alum solution was made by mixing 2856 g of $Al_2(SO_4)_3XH_2$ (17.2% $Al_2O_3$), 2837 g of $H_2SO_4$, 16.4 lb of $H_2O$, 842 g TMACl (50%) solution and 39.6 lb of pre-reacted organics (1.51% N by weight). The gel forming, mixing and crystallization steps were all identical to those of Example 9. The crystallization took 30 hours to complete. The washed and dried product was 125% ZSM-5 having a $SiO_2$ to $Al_2O_3$ ratio of 37.3. The crystal size range was found by SEM pictures to be $11X8X4\mu$ to $0.5X0.5X0.3\mu$.

EXAMPLE 20

A silicate solution was made by mixing 45.5 lbs of Q-brand sodium silicate, 60 g of Daxad 27 and 52.6 lbs of $H_2O$. An acid alum solution was made by mixing 714 g of $Al_2(SO_4)_3XH_2O$ (17.2% $Al_2O_3$), 1785 g of $H_2SO_4$, 44.4 lbs of $H_2O$, 8424 g of TMACl (50%) solution and 39.5 lbs of pre-reacted organics (1.51% N by wt.). The gel forming, mixing and crystallization steps were all identical to those of Example 18. The crystallization took 43 hours to complete. The washed and dried product was 85% ZSM-5 and had a $SiO_2$ to $Al_2O_3$ ratio of 71.3. The crystal size range was found by SEM picture to be $20X8X4\mu$ to $0.7X0.5X0.2\mu$.

EXAMPLE 21

A silicate solution was made according to Example 20. An acid alum solution was made by mixing 357 g of $Al_2(SO_4)_3XH_2O$ (17.2% $Al_2O_3$), 1962 g of $H_2SO_4$, 44.4 lbs of $H_2O$, 8424 g of TMACl (50%) solution and 39.5 lbs of pre-reacted organics (1.45% N by wt.). The gel forming, mixing and crystallization steps were all identical to those of Example 18. The crystallization was completed within 50 hours. The washed and dried product was 110% ZSM-5 and had a $SiO_2$ to $Al_2O_3$ ratio of 139.9. The crystal size range was found by SEM to be $25X8X4\mu$ to $6X3X1\mu$.

EXAMPLE 22

An alum solution was made by mixing 238 g of $Al_2(SO_4)_3XH_2O$ (17.2% $Al_2O_3$), 202 g of $H_2SO_4$, 400 g of NaOH, 1200 g of TMACl (50%) solution and 3682 g of pre-reacted organics (1.22% N by wt.). The above solution was charged into a 5 gallon autoclave and 2132 g of Hi-Sil (a form of precipitated $SiO_2$) was added to the solution. The mixture was crystallized at 320° F. with 90 rpm. The crystallization was completed with 114 hours. The washed and dried product was 100% ZSM-5 and had a $SiO_2$ to $Al_2O_3$ mole ratio of 65.2. The crystal size was measured by SEM to be from $20X10X5\mu$ to $8X6X4\mu$.

EXAMPLE 23

A silicate solution was made according to Example 14. An acid alum solution was made by mixing 238 g of $Al_2(SO_4)_3XH_2O$ (17.2% $Al_2O_3$), 574 g of $H_2SO_4$, 1200 g of TMACl (50%) solution and 3480 g of $H_2O$. The two solutions were charged to the 5 gallons autoclave simultaneously to form a gel. After the gel was whipped for one half hour at 250 rpm and room temperature, 1148 g of n-propylamine was added. The autoclave was again sealed. The crystallization took 31 hours to complete at 320° F. and 90 rpm agitation. The washed and dried product was found to be 80% ZSM-5 having a $SiO_2$ to $Al_2O_3$ ratio of 62.8. The sodium content of the product was 0.4. The crystal size range was estimated by electron microscopy to be $10X4X4\mu$ to $2X1X1\mu$.

EXAMPLE 24

A silicate solution was made according to Example 18. An acid alum solution was made by mixing 1428 g of $Al_2(SO_4)_3XH_2O$ (17.2% $Al_2O_3$), 3444 g of $H_2SO_4$, 7200 g of TMACl (50%) solution and 46.1 lbs of $H_2O$. The above solutions were charged into a 30 gallon autoclave and mixed into the same homogenous gel mixture as that described in Example 18. Then 3005 g of tri n-propylamine and 2584 g of n-propylbromide were added on top of the gel. The mixture was crystallized at 320° F. and 90 rpm agitation. The crystallization took 18.3 hours. The washed and dried product was found to be 105% ZSM-5 and to have a $SiO_2$ to $Al_2O_3$ mole ratio of 73.9. The crystal size was measured by SEM to be $15X12X6\mu$ to $1X0.7X0.5\mu$.

EXAMPLE 25

A silicate solution was prepared by mixing 90.9 lbs of Q-brand sodium silcate, 118 g of Daxad 27 and 52.6 lbs of $H_2O$. An acid alum was prepared by mixing 1430 g of $Al_2(SO_4)_3H_2O$ (17.2% $Al_2O_3$), 3440 g of $H_2SO_4$, 1840 g of NaCl, 20.8 lbs of pre-reacted TPABr solution (1.43% N by wt.) and 38.9 lbs of $H_2O$. The above two solutions were charged through a mixing nozzle into a 30 gallon autoclave to which had been added 1180 g of $H_2O$. After the gel was formed, 5840 g of NaCl was added into the gel. The autoclave was sealed and heated to 320° F. as soon as possible. The agitation speed was set at 90 rpm. The crystallization took about 10 hours to complete. The washed and dried product was 100% ZSM-5 with a silica to alumina ratio of 66.2. The crystal size was small, as shown by transmission electromicrospic picture to be $0.3X0.2\mu$ to $0.1X0.05\mu$.

This Example 25 serves as a base case to show the importance of the effect of additional cations such as TMA on crystal size.

EXAMPLE 26

A silicate solution was prepared by mixing 28.9 parts by weight of Q-brand sodium silicate, (28.5% $SiO_2$, 8.9% $Na_2O$), 16.7 parts by weight $H_2O$, and 0.082 Daxad 27. Daxad 27 is a dispersant which is a sodium salt of polymerized substituted benzoid alkyl sulfonic acid combined with an inert inorganic suspending agent available from W. R. Grace; Polymers and Chemicals Division; Cambridge, Ma. 02140. The solution exhibited a specific gravity of 1.232 at 60° F. An acid alum solution was prepared by mixing 1.0 part by weight of $Al_2(SO_4)_3$. $XH_2O$ (16.4% $Al_2O_3$), 2.9 parts by weight of 100 percent $H_2SO_4$, 2.9 parts by weight of an aqueous 50% tetra-methyl-ammonium chloride (TMACl) solution, 8.9 parts by weight of $H_2O$, and 11.5 parts by weight of an aqueous tetra-propyl-ammonium bromide (TPABr) solution obtained by prereacting a mixture of equivalent molar amounts of tri-n-propylamine and n-propylbromide (the nitrogen content of the prereacted organic mixture was 1.5 percent by weight). In the following Examples, the TPABr solution will be referred to as "prereacted organics". The specific gravity of the acid alum solution was 1.110 at 60° F. The above solutions were charged into an autoclave containing 2.2 parts by weight $H_2O$. The charging was performed by feeding the solutions through a mixing nozzle simultaneously. 5.4 parts by weight $H_2O$ were then added to the gel. After whipping the gel at 250 rpm for one hour, 1.9 parts by weight NaCl were added (NaCl/$Al_2O_3$ mole ratio=19). Whipping at 250 rpm was continued for several more hours. The pH of the mixture was observed to drift upward over time. This pH was adjusted to essentially its original level by incremental addition of acid. The mixture was then heated to 320° F. with 40 rpm agitation. Crystallization was complete within 20 hrs. The product ZSM-5 exhibited a crystallinity of 125% and a $SiO_2$ to $Al_2O_3$ ratio of 77. Scanning electron micrographs showed a very uniform crystalline size of 15X7X3.5 microns.

What is claimed is:

1. A method for preparing ZSM-5, said method comprising forming an aqueous reaction mixture comprising sources of silica, alumina, tetrapropylammonium cations and tetramethylammonium cations, wherein said reaction mixture includes a source of deliberately added alumina which is not an aluminum containing impurity from the other reactants and/or equipment used, and maintaining said reaction mixture under sufficient crystallization conditions until crystals of said ZSM-5 are formed.

* * * * *